(12) United States Patent
Leftridge

(10) Patent No.: US 6,390,527 B1
(45) Date of Patent: May 21, 2002

(54) SLIDABLE TAILGATE

(76) Inventor: George Leftridge, 308 W. Wilding Dr., Montgomery, AL (US) 36116-3738

( * ) Notice: Subject to any disclaimer, the term of this patent is extended or adjusted under 35 U.S.C. 154(b) by 0 days.

(21) Appl. No.: 09/732,683

(22) Filed: Dec. 8, 2000

(51) Int. Cl.⁷ ............................................. B62D 33/023
(52) U.S. Cl. ......................... 296/56; 296/50; 296/37.6
(58) Field of Search ............................. 296/50, 51, 52, 296/56, 57.1, 59, 100.04, 100.07, 37.6

(56) References Cited

U.S. PATENT DOCUMENTS

| | | |
|---|---|---|
| 3,649,072 A | 3/1972 | Cross |
| 3,765,717 A | 10/1973 | Garvert |
| 4,199,188 A | 4/1980 | Albrecht et al. ............ 296/100 |
| 4,418,954 A | 12/1983 | Buckely ..................... 296/100 |
| 4,522,326 A * | 6/1985 | Tuohy III .............. 296/37.6 X |
| 4,585,265 A | 4/1986 | Mader ............................ 296/1 |
| 4,659,136 A * | 4/1987 | Martin et al. ................ 296/100 |
| 4,695,087 A | 9/1987 | Hollrock .......................... 296/14 |
| 4,717,196 A | 1/1988 | Adams ......................... 296/98 |
| 4,762,360 A * | 8/1988 | Huber ......................... 296/100 |
| 4,861,096 A * | 8/1989 | Hastings ..................... 296/183 |
| 4,900,080 A | 2/1990 | Morris, II .................... 296/100 |
| 4,943,194 A | 7/1990 | Aguilar ....................... 410/132 |
| 5,007,670 A * | 4/1991 | Wise ......................... 296/39.1 |
| 5,039,154 A | 8/1991 | Lewis .......................... 296/52 |
| 5,087,093 A | 2/1992 | Repetti ........................ 296/100 |
| D343,809 S | 2/1994 | Cannon ........................ D12/98 |
| 5,411,355 A * | 5/1995 | Grosnell et al. ............ 410/139 |
| 5,427,428 A | 6/1995 | Ericson et al. ................ 296/98 |
| 5,470,642 A * | 11/1995 | Egigian ....................... 428/192 |
| 5,630,637 A * | 5/1997 | Sauri ........................ 296/180.1 |
| 5,899,544 A | 5/1999 | James et al. ................ 312/198 |
| 5,927,783 A | 7/1999 | Baka ......................... 296/37.6 |
| 6,015,177 A * | 1/2000 | Tijerina ..................... 296/37.6 |
| 6,039,379 A | 3/2000 | Jordan ....................... 296/37.6 |
| 6,179,361 B1 * | 1/2001 | Sailors ........................ 296/50 |

FOREIGN PATENT DOCUMENTS

JP 04027678 A * 1/1992 ................. 296/50

* cited by examiner

Primary Examiner—Joseph D. Pape
Assistant Examiner—Lori L Coletta
(74) Attorney, Agent, or Firm—Rudolf O. Siegesmund

(57) ABSTRACT

A slidable tailgate for a vehicle having a cab wall, a first wall, a second wall and a bed is disclosed. The slidable tailgate has four pins adapted for extension beyond said tailgate and for retraction within said tailgate by a plurality of handles. Two sets of rails, each of said set having a continuous groove for receiving the extended pins of the slidable tailgate are either built into the first wall and second wall or are attached to the first wall and second wall. The slidable tailgate may operate as a conventional tailgate or it may be moved to a storage position parallel to the cab wall by retraction and engagement of the pins and slidable movement along the rails.

18 Claims, 7 Drawing Sheets

(VIEW 4-4)

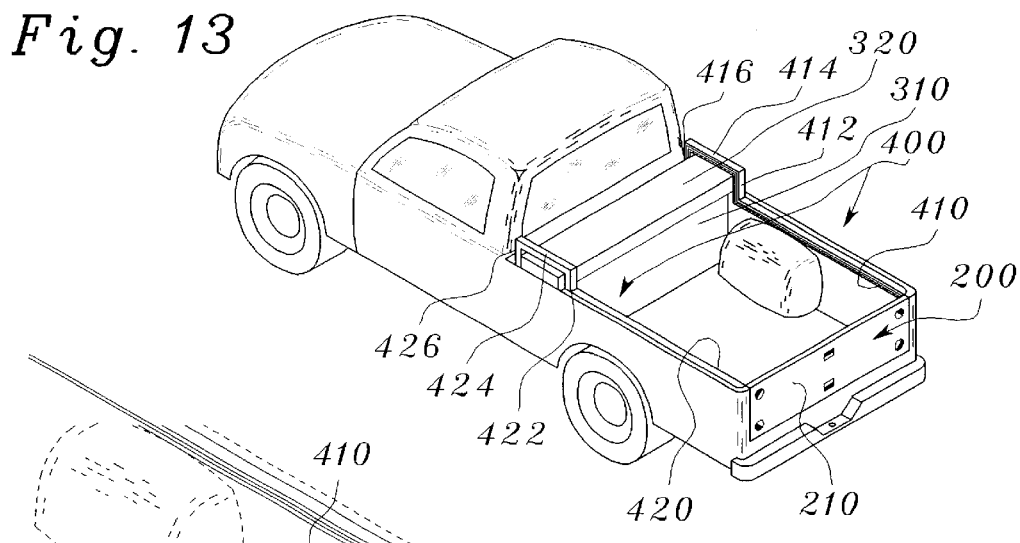
*Fig. 13*
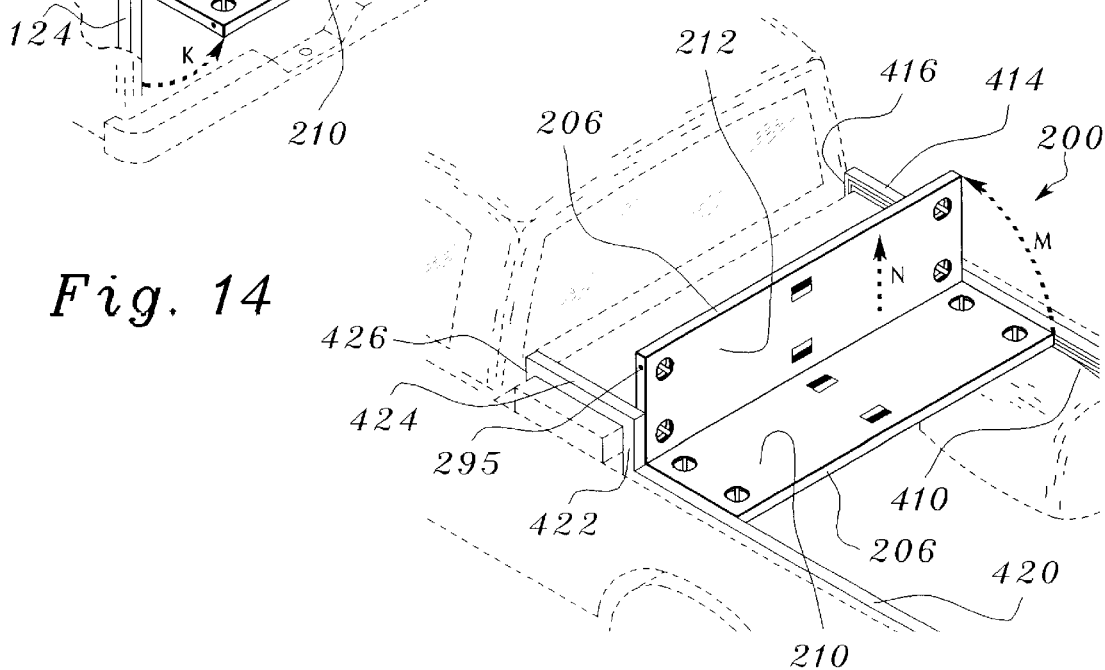
*Fig. 15*
*Fig. 14*

SLIDABLE TAILGATE

BACKGROUND OF THE INVENTION

1. Field of the Invention

The present invention relates to a tailgate of a pickup truck that can be moved from the rear of the truck bed to the front of the truck bed using a set of rails.

2. Description of the Prior Art

Owners of trucks having open beds behind the cab of the truck often take off the tailgate to avoid the drag which the tailgate creates in highway travel. Truck owners who remove the tailgate notice an increase in gas mileage due to the lessening in drag. After removing the tailgate, some owners replace the metal tailgate with a cargo net that allows air to pass through but serves to keep items inside the bed of the truck. However, certain loads may require the stronger and more durable conventional tailgate. A problem arises if the dismounted tailgate is needed and the truck owner is at an inconvenient distance from where the dismounted tailgate has been stored. Therefore, a need exists for a way to remove a tailgate from its vertical position in the rear of the truck to a convenient stowage position in the truck.

The prior art discloses a variety of inventions for changing the position of the tailgate of a truck. U.S. Pat. No. 5,630,637 (the '637 patent) discloses a motor driven chain and sprocket device for moving the tailgate from a vertical position in the rear of the truck bed to a horizontal position, or to a slanted spoiler position. In addition, the '637 patent discloses a horizontal shaft extending through the tailgate that extend into a groove in an inside overlap lip in a side of the truck bed. A pair of disks on each end of the horizontal shafts form a spool for rolling along each of the grooves. U.S. Pat. No. 4,585,265 (the '265 patent) discloses a tailgate which can be moved from a normal closed position to either a normal open position, or to an elevated horizontal storage. In the '265 patent the tailgate can be repositioned by pins that can be retracted by operating handles on the tailgate.

SUMMARY OF THE INVENTION

The tail gate which meets the needs identified above is a slidable tailgate for a vehicle having a cab wall, a first wall, a second wall and a bed. The slidable tailgate has four pins adapted for extension beyond said tailgate and for retraction within said tailgate by a plurality of handles. Two sets of rails, each of said set having a continuous groove for receiving the extended pins of the slidable tailgate are either built into the first wall and second wall or are attached to the first wall and second wall. The slidable tailgate may operate as a conventional tailgate or it may be moved to a storage position parallel to the cab wall by retraction and engagement of the pins and slidable movement along the rails.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 13 depicts a rail system for a tailgate attached to the storage container;

FIG. 14 depicts the tailgate positioned for movement toward the cab wall;

FIG. 15 depicts the tailgate positioned to negotiate the storage container using rails affixed to the storage container;

DESCRIPTION OF PREFERRED EMBODIMENTS

Figure 1:
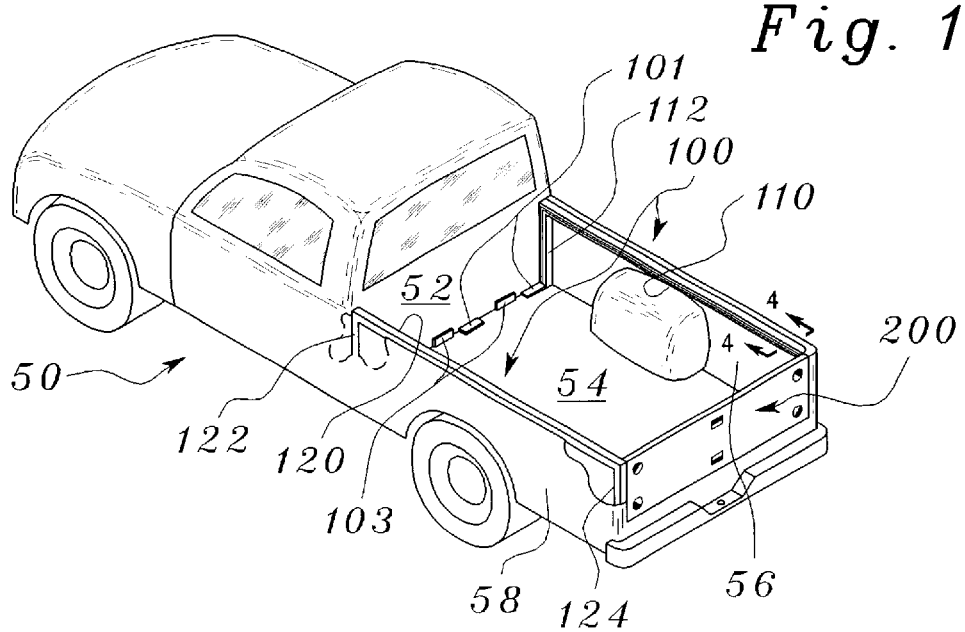
FIG. 1 depicts the tailgate installed on a truck.

In FIG. 1, truck 50 has cab wall 52, first wall 56, second wall 58, bed 54, a system 100 and tailgate 200. Rail system 100 has first horizontal rail 110, second horizontal rail 120, first front vertical rail 112 fixedly engaged to first horizontal rail 110, second front vertical rail 122 (mirrors first front vertical rail 112) fixedly engaged to second horizontal rail 120, first rear vertical rail 114 (see FIG. 2) and second rear vertical rail 124 (mirrors first rear vertical rail 114). Rail system 100 may be built into first wall 56 and second wall 58 of truck 50. Alternatively, rail system 100 may be retrofitted into truck 50 by welding. First pads 101 are installed on bed 54 so that they are adjacent to cab wall 52. First pads 101 may be made from rubber or other suitable resilient shock absorbing material to provide a rest for tailgate 200 when it is moved to a storage position parallel to cab wall 52. Second pads 103 are installed on cab wall 52 so that when tailgate 200 is stored parallel to cab wall 52 tailgate 200 will not rattle due to the vibration of the vehicle. In an alternate embodiment, rail system 100 may have only first horizontal rail 110 and second horizontal rail 120.

Figure 2:
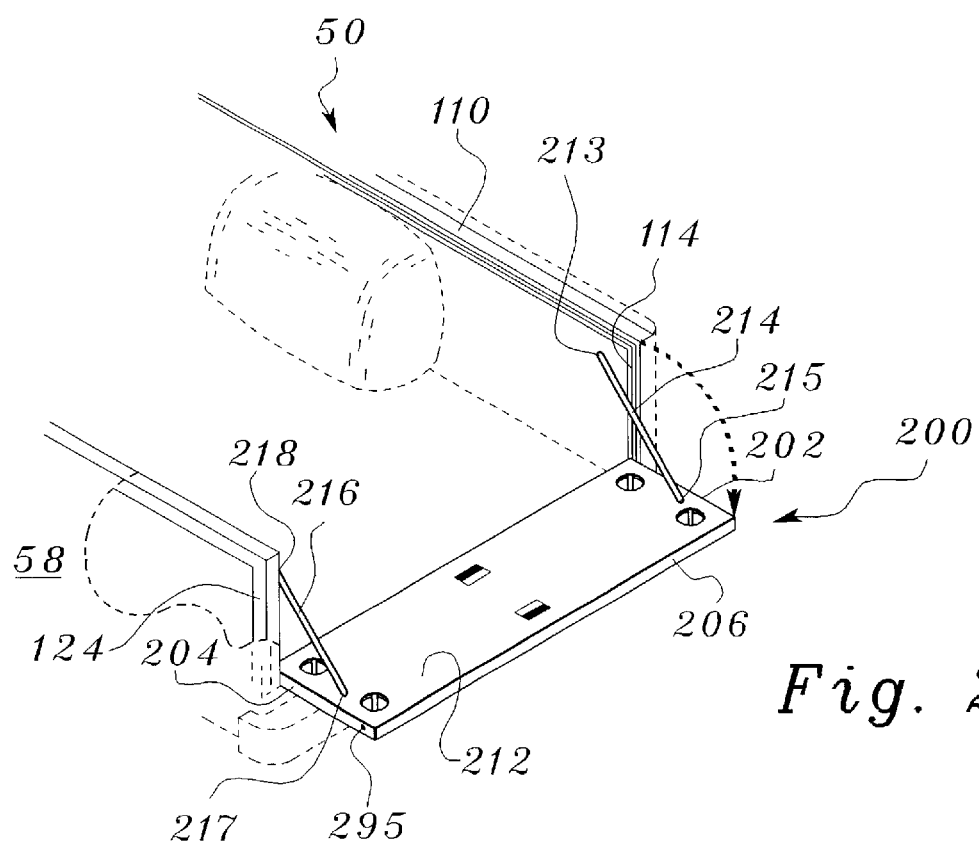
FIG. 2 depicts the tailgate opened for loading.

FIG. 2 depicts tailgate 200 opened in the manner of a conventional tailgate. First rear vertical rail 114 can be seen when tailgate 200 is opened. First rear vertical rail 114 may be the same as first front vertical rail 112 shown in FIG. 1 whereby it is fixedly engaged to first horizontal rail 110. In the same manner, second rear vertical rail 124 mirrors first rear vertical rail 114 and is fixedly engaged to second horizontal rail 120. Right cable 214 has right cable first end 213 removably affixed to first wall 56 and right cable second end 215 removably affixed to front face 210 of tailgate 200. Left cable 216 has left cable first end 218 (behind second wall 58) removably affixed to second wall 58 and left cable second end 217 removably affixed to front face 210 of tailgate 200. Tailgate 200 is rotatably affixed to first rear vertical rail 114 by second pin 292 (See FIG. 3) and is rotatably affixed to second rear vertical rail 124 by third pin 294 (See FIG. 3). Third pin aperture 295 is visible on tailgate 200. In the alternate embodiment in which rail system 100 has only first horizontal rail 110 and second horizontal rail 120, tailgate 200 is rotatably engaged to first wall 56 and second wall 58 by removable and rotatable engagement of second pin 292 and third pin 294 with a first set of holes (not shown) for receiving second pin 292 and third pin 294 and affixed in the upright position by removable engagement of first pin 290 and fourth pin 296 with a second set of holes (not shown) in first wall 56 and second wall 58.

Figure 3:
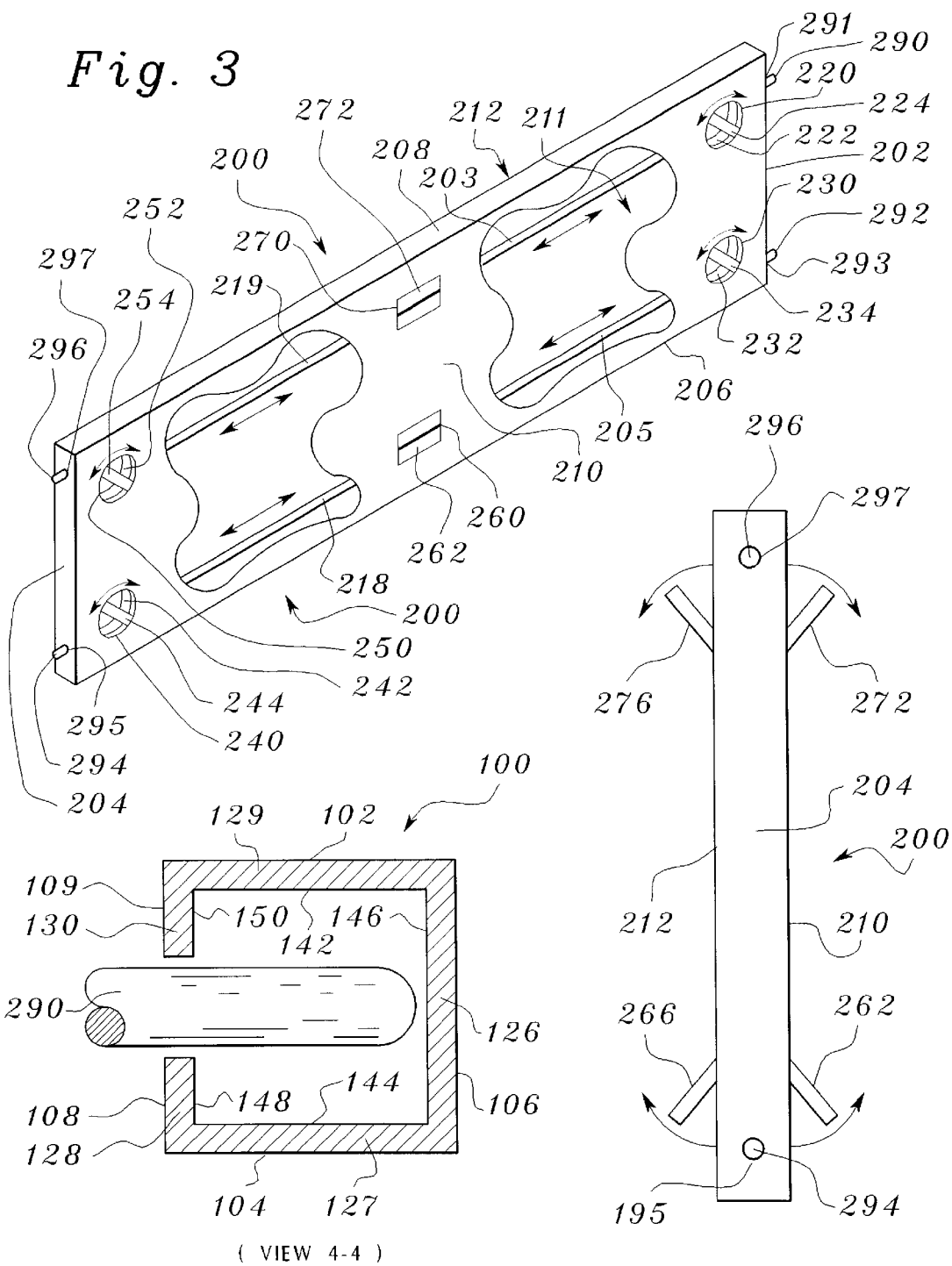
FIG. 3 depicts the tailgate.

FIG. 3 depicts tailgate 200 having first side 202, second side 204, first end 206, second end 208, front face 210 and rear face 212 which together form the exterior of tailgate 200 and define interior cavity 211. Tailgate 200 further has first pin 290, second pin 292, third pin 294 and fourth pin 296, each of which can extend outside of tailgate 200 and be withdrawn inside tailgate 200. First side 202 has first pin aperture 291, through which first pin 290 may extend or retract, and second pin aperture 293 through which second pin 292 may extend or retract.

First pin 290 may be caused to extend or retract in first pin aperture 291 by turning first handle 224 fixedly engaged to first casing 222 for rotatable engagement in tailgate 200. First handle 224 is accessed through first handle aperture 220 in tailgate 200. First pin 290 may also be extended by pushing in or retracted by pulling out on first dual handle 272 seated within first dual handle aperture 270 or by pushing in or pulling out on third dual handle 276 (see FIG. 5) in tailgate 200. Second pin 292 may be caused to extend or retract by turning second handle 234 fixedly engaged to second casing 232 for rotatable engagement in tailgate 200. Second handle 234 is accessed through second handle aperture 230 in tailgate 200. Second pin 292 may also be extended by pushing in or retracted by pulling out on second dual handle 262 seated within second dual handle aperture 260 or by pushing in or pulling out on fourth dual handle 266 (see FIG. 5) of tailgate 200. Third pin 294 may be caused to extend or retract through third pin aperture 295 by turning third handle 244 fixedly engaged to third casing 242 for rotatable engagement in tailgate 200. Third handle 244 is accessed through third handle aperture 240 in tailgate 200. Third pin 294 may also be extended by pushing in or retracted by pulling out on second dual handle 262 seated within second dual handle aperture 260 or by pushing in or pulling out on third dual handle 276 (see FIG. 5) in tailgate 200. Fourth pin 296 may be caused to extend or retract through fourth pin aperture 297 by turning fourth handle 254 fixedly engaged to fourth casing 252 for rotatable engagement in tailgate 200. Fourth handle 254 is accessed through fourth handle aperture 250 in tailgate 200. Fourth pin 296 may also be extended by pushing in or retracted by pulling out on first dual handle 272 seated within first dual handle aperture 270 or by pushing in or pulling out on third dual handle 276 (see FIG. 5) in tailgate 200. First connecting rod 203 links first dual handle 272 and third dual handle 276 (See FIG. 5) to first pin 290. Second connecting rod 205 links second dual handle 262 and fourth dual handle 266 (See FIG. 5) to second pin 292. Third connecting rod 207 links second dual handle 262 and fourth dual handle 266 to third pin 294. Fourth connecting rod 219 links first dual handle 272 and third dual handle 276 (See FIG. 5) to fourth pin 296.

Figure 4:
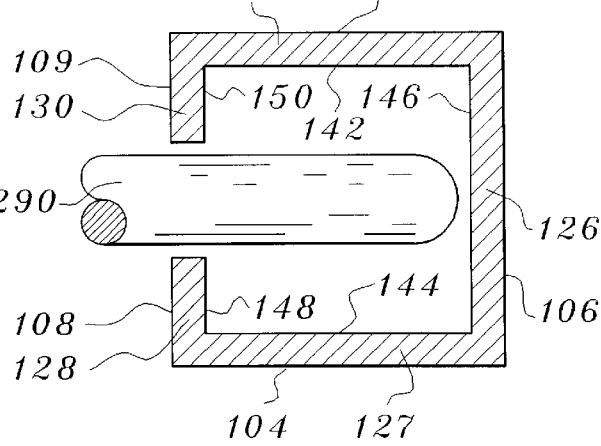
FIG. 4 depicts a cross section along cut line 4—4 of FIG. 1.

FIG. 4 depicts a cross sectional view of first horizontal rail 110 along cut line 4—4 of FIG. 1. All rail sections depicted herein have the same center groove for receiving the extended pins of tailgate 200. Rail top 129 is fixedly engaged to rail first front 130 and to rail rear 126. Rail bottom 127 is fixedly engaged to rail second front 128 and to rail rear 126. First horizontal rail 110 has rail top surface 102, rail rear surface 106, rail bottom surface 104, rail top front surface 109 and rail bottom front surface 108 which together define the exterior of first horizontal rail 110. First horizontal rail 110 has rail inside top surface 142, rail inside rear surface 146, rail inside bottom surface 144, rail first inside front surface 150 and rail second inside front surface 148 which together define the interior space of first horizontal rail 110. The interior space of first horizontal rail 110 is accessed through the gap between rail first front 130 and rail second front 128. The gap between rail first front 130 and rail second front 128 is large enough to allow free passage of first pin 290, second pin 292, third pin 294 or fourth pin 296. Only first horizontal rail 110 is described in detail. All rail sections appear the same in cross section and differ only in length. All rail sections are joined together so that the grooves of each section join to form a continuous groove. For example, first horizontal rail 110 is joined to first front vertical rail 112 so that a continuous groove is formed between both sections. Likewise (referring to FIG. 2), a continuous groove is formed between first horizontal rail 110 and first rear vertical rail 114. As used herein, the term groove shall refer to the opening in a rail section for receiving one or two pins of tailgate 200 depending on the position and maneuvering orientation of tailgate 200. When two rail sections are joined, the rail sections are joined at approximate right angles so that the grooves of each rail section will also join at approximate right angles. Alternatively, the grooves in the rail sections may be joined so that the groove curves at the joint facilitating passage of the pins of tailgate 200. The center of the rail sections may be filled with plastic so that the groove in which the pins travel is smooth and a low friction surface is presented to facilitate passage of the pins. In addition, the interior space of the rail sections may be filled with a top section having a plurality of rollers and a bottom section having a plurality of rollers for receiving slidable passage of the pins. Alternatively, the rail sections may be built into first wall 56 and second wall 58 so that rail top front surface 109 and rail bottom front surface 108 (or their corresponding parts for other rail sections) are in the same plane as the surface of first wall 56 and second wall 58 which face into the bed of the truck.

Figure 5:
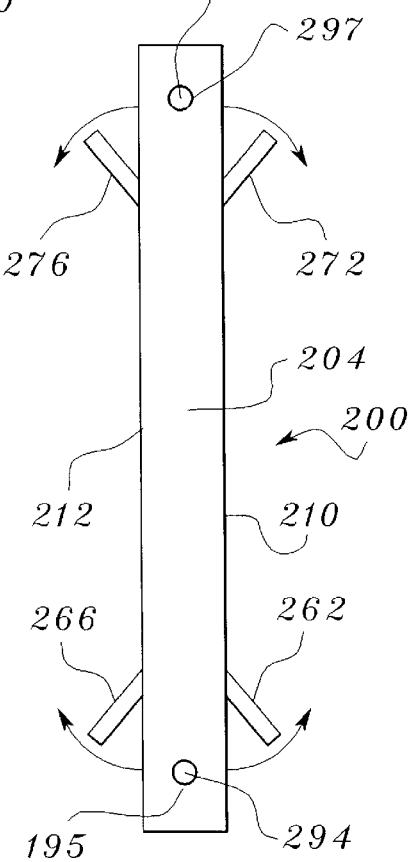
FIG. 5 a side view of the tailgate.

FIG. 5 depicts a view of tailgate 200 viewed from second side 204. It can be seen that tailgate 200 is reversible and can operate even if switched from right to left or from top to bottom.

Figure 6:
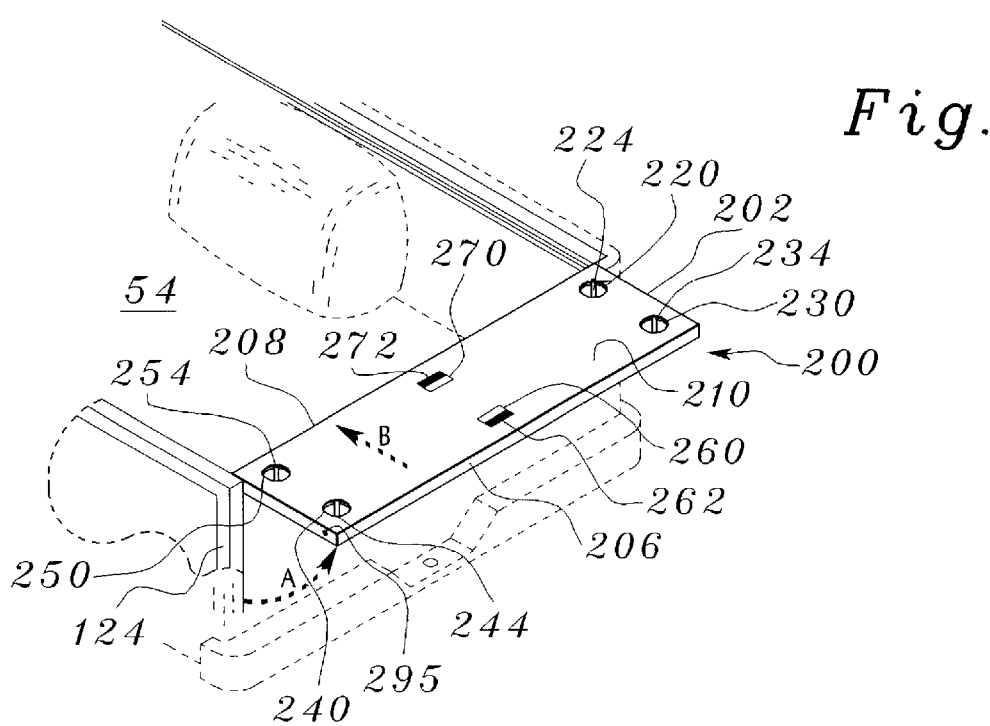
FIG. 6 depicts the tailgate positioned for movement toward the cab of the truck.

FIG. 6 shows the first stage in moving tailgate 200 from its position at the rear of truck 50 to a position parallel to cab rear wall. In order to describe the manner in which tailgate 200 is moved, reference is also made to FIGS. 3, 4 and 5. Second pin 292 and third pin 294 are withdrawn by rotating second handle 234 and third handle 244 respectively. In the alternative, second pin 292 and third pin 294 may be withdrawn from first rear vertical rail 114 and second rear vertical rail 124 respectively by outward extension of second dual handle 262. Tailgate 200 is rotated in direction A about first pin 290 and fourth pin 296 until front face 210 is parallel to the bed 54 of truck 50. Tailgate 200 is then pushed forward so that first pin 290 and fourth pin 296 slide in the grooves of first horizontal rail 110 and second horizontal rail 120. When second pin 292 (retracted) and third pin 294 (retracted) are next to the respective grooves of first horizontal rail 110 and second horizontal rail 120, second pin 292 and third pin 294 are extended by rotation of second handle 234 and third handle 244 respectively, or alternatively by pushing second dual handle 262 back into tailgate 200. With all four pins engaged in first horizontal rail 110 and second horizontal rail 120, tailgate 200 may be pushed in direction B all the way forward to cab wall 52. In the embodiment where rail system 100 has only first horizontal rail 110 and second horizontal rail 120, tailgate 200 would be removed from the holes in first wall 56 and second wall 58 by retraction of all four pins, and first pin 290 and fourth pin 296 would be inserted into first horizontal rail 110 and second horizontal rail 120.

Figure 7:
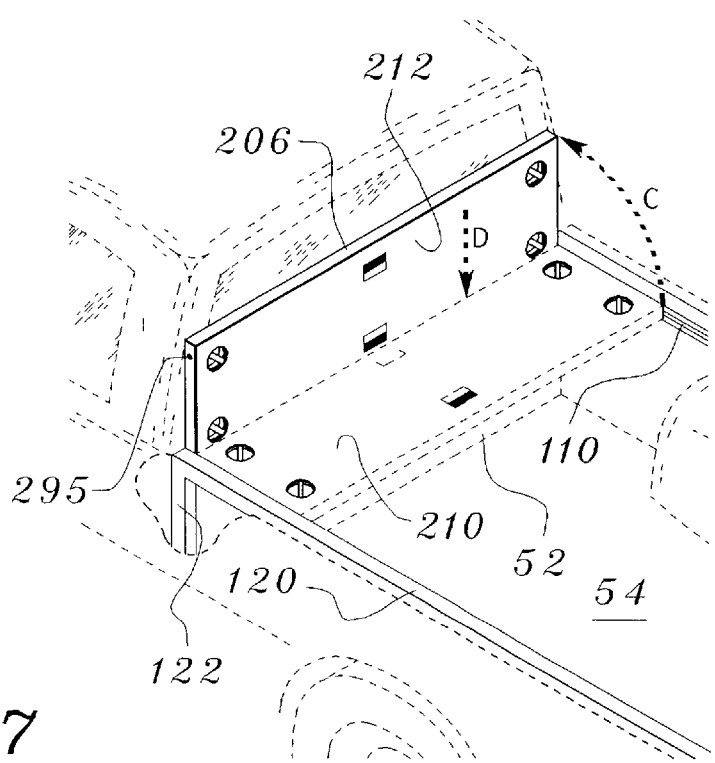
FIG. 7 depicts the tailgate positioned for storage parallel to the cab of the truck.

Referring to FIG. 7, when tailgate 200 reaches a position near cab wall 52, second pin 292 and third pin 294 are withdrawn to allow rotation of slidable tailgate 200 about first pin 290 and fourth pin 296. Tailgate 200 is rotated in direction C until rear face 212 is parallel to the cab of the truck (or in other words, perpendicular to the bed of the truck) and then pushed downward in direction D. When pushed downward in direction D, first pin 290 and fourth pin 296 slide downward in the grooves of first front vertical rail 112 and second front vertical rail 122. Second end 208 is now facing downward and will come to rest on first pads 101. Second pin 292 and third pin 294 are then extended to secure tailgate 200 in its stowed position parallel to the cab of truck 50. In the embodiment where rail system 100 has only first horizontal rail 110 and second horizontal rail 120, when tailgate 200 reaches a position near cab wall 52, second pin 292 and third pin 294 are withdrawn to allow rotation of slidable tailgate 200 about first pin 290 and fourth pin 296 so that first end 206 rotates downward about first pin 290 and fourth pin 296 until first end 206 contacts first pads 101 and rear face 212 contacts second pads 103 (see FIG. 1).

Figures 8, 9, 10:
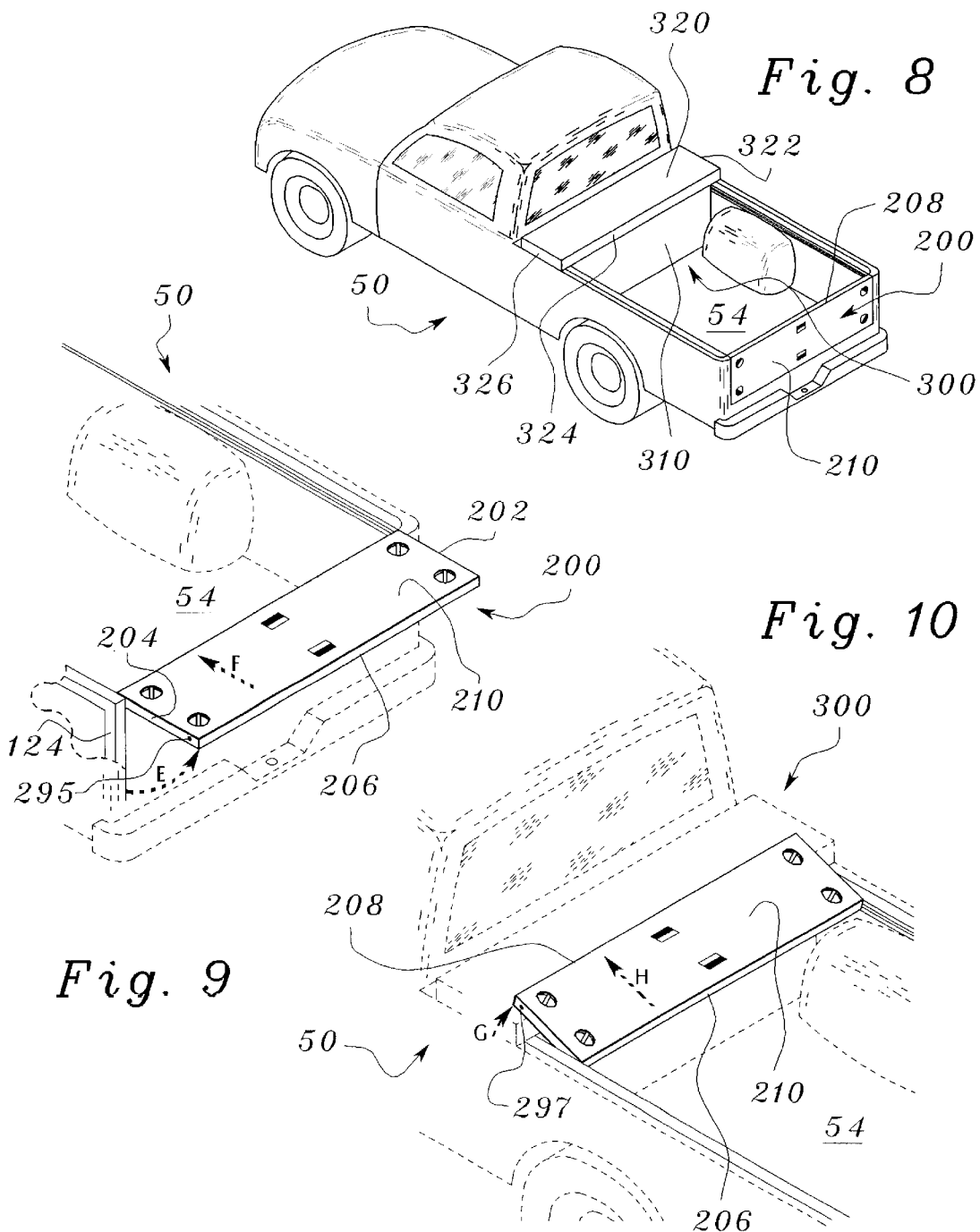
FIG. 8 depicts the tailgate with a storage container in the truck.
FIG. 9 depicts the tailgate positioned for movement toward the cab of the truck.
FIG. 10 depicts the tailgate positioned to negotiate the storage container.

FIG. 8 depicts truck 50 with rails for tailgate 200 as described above, and with the addition of container 300. Container 300 has bottom 310 and top 320. Top 320 has front edge 324, right edge 322 and left edge 326. Right edge 322 of top 320 overlaps first horizontal rail 110 so that top 320 rests on first horizontal rail 110. Left edge 326 of top 320 overlaps second horizontal rail 120 so that top 320 rests on second horizontal rail 120.

FIG. 9 shows the first stage in moving tailgate 200 from its position at the rear of truck 50 to a storage position parallel to cab wall 52. In order to describe the manner in which tailgate 200 is moved, reference is also made to FIGS. 3, 4 and 5. Second pin 292 and third pin 294 are withdrawn by rotating second handle 234 and third handle 244 respectively. In the alternative, second pin 292 and third pin 294 may be withdrawn from first rear vertical rail 114 and second rear vertical rail 124 respectively by outward extension of second dual handle 262. Tailgate 200 is rotated in direction E about first pin 290 and fourth pin 296 until front face 210 is parallel to the bed of truck 50. Tailgate 200 is then pushed forward so that first pin 290 and fourth pin 296 slide in the grooves of first horizontal rail 110 and second horizontal rail 120. When second pin 292 (retracted) and third pin 294 (retracted) are next to the respective grooves of first horizontal rail 110 and second horizontal rail 120, second pin 292 and third pin 294 are extended by rotation of second handle 234 and third handle 244 respectively, or alternatively by pushing second dual handle 262 back into tailgate 200. With all four pins engaged in first horizontal rail 110 and second horizontal rail 120, tailgate 200 may be pushed in direction F.

Referring to FIG. 10, when tailgate 200 is in the proximity of front edge 324 of top 320 first pin 290 and fourth pin 296 are withdrawn so that second end 208 of tailgate 200 may be rotated in direction G and tailgate 200 pushed forward in direction H until second end 208 is over top 320.

Figure 11:
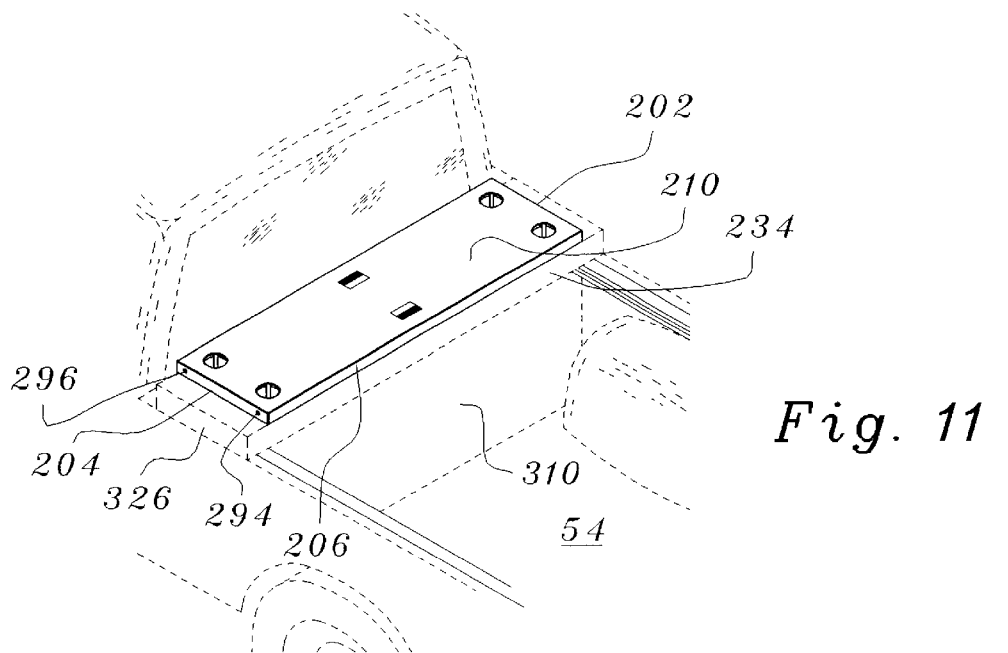
FIG. 11 depicts the tailgate negotiating the storage container.

In FIG. 11, tailgate 200 is laying flat on top of top 320. In order to get tailgate 200 onto top 320, second pin 292 and third pin 294 are withdrawn so that first end 206 can be raised until parallel with top 320, and tailgate 200 pushed onto top 320.

Figure 12:
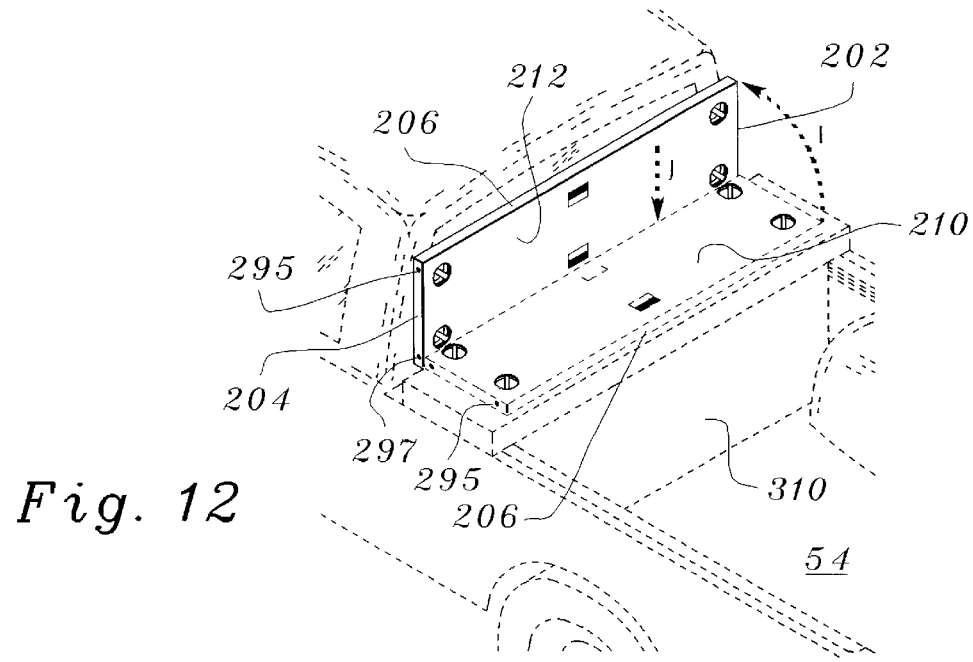
FIG. 12 depicts the tailgate positioned for storage between the cab of the truck and the storage container.

In FIG. 12, first end 206 of tailgate 200 is rotated in direction I until rear face 212 is perpendicular to the bed of the truck. Tailgate 200 may then be lowered in direction J onto first pads 101. Before lowering, first pin 290 and fourth pin 296 are extended into the groove of first front vertical rail 112 and second front vertical rail 122. When second pin 292 and third pin 294 are next to the grooves of first front vertical rail 112 and second front vertical rail 122, second pin 292 and third pin 294 are extended to lock tailgate 200 into position.

FIGS. 13 through 15 depict an alternate embodiment of the tailgate system in which rails are added to container 300. Alternate rail system 400 has first rear vertical rail 114 (not shown), first rear horizontal rail 410, first container vertical rail 412, first container horizontal rail 414 and first front extended vertical rail 416. Alternate rail system 400 also has second rear vertical rail 124, second rear horizontal rail 420, second container vertical rail 422, second container horizontal rail 424, and second front extended vertical rail 426.

FIG. 14 shows the first stage in moving tailgate 200 from its position at the rear of truck 50 to a position parallel to cab wall 52. In order to describe the manner in which tailgate 200 is moved, reference is also made to FIGS. 3, 4 and 5. Second pin 292 and third pin 294 are withdrawn by rotating second handle 234 and third handle 244 respectively. In the alternative, second pin 292 and third pin 294 may be withdrawn from first rear vertical rail 114 and second rear vertical rail 124 respectively by outward extension of second dual handle 262. Tailgate 200 is rotated in direction K about first pin 290 and fourth pin 296 until front face 210 is parallel to bed 54 of truck 50. Tailgate 200 is then pushed forward in direction L so that first pin 290 and fourth pin 296 slide in the grooves of first rear horizontal rail 410 and second rear horizontal rail 420. When second pin 292 (retracted) and third pin 294 (retracted) are next to the respective grooves of first rear horizontal rail 410 and second rear horizontal rail 420, second pin 292 and third pin 294 are extended by rotation of second handle 234 and third handle 244 respectively, or alternatively by pushing second dual handle 262 back into tailgate 200. With all four pins engaged in first rear horizontal rail 410 and second rear horizontal rail 420, tailgate 200 may be pushed forward in direction L.

In FIG. 15, tailgate 200 is slid forward until first pin 290 and fourth pin 296 reach the end of the groove in first rear horizontal rail 410 and second rear horizontal rail 420. Tailgate 200 is then rotated about first pin 290 and fourth pin 296 in direction M until front face 210 is facing cab wall 52 (see FIG. 1). Tailgate 200 is raised upward in direction N until first pin 290 and fourth pin 296 reach the end of the groove in first container vertical rail 412 and second container vertical rail 422 respectively.

Figure 16:
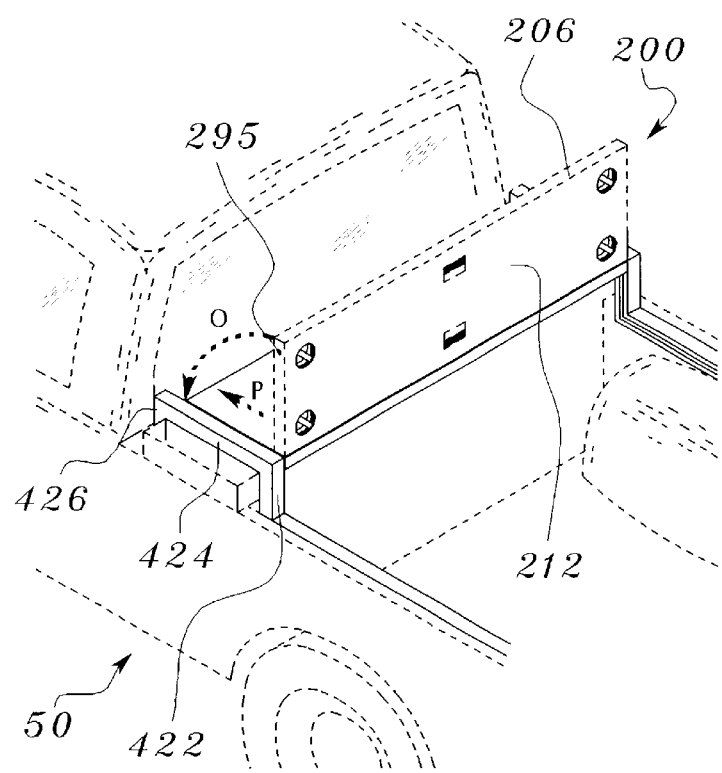
FIG. 16 depicts the tailgate traversing the storage container using rails affixed to the storage container.
Figure 17:
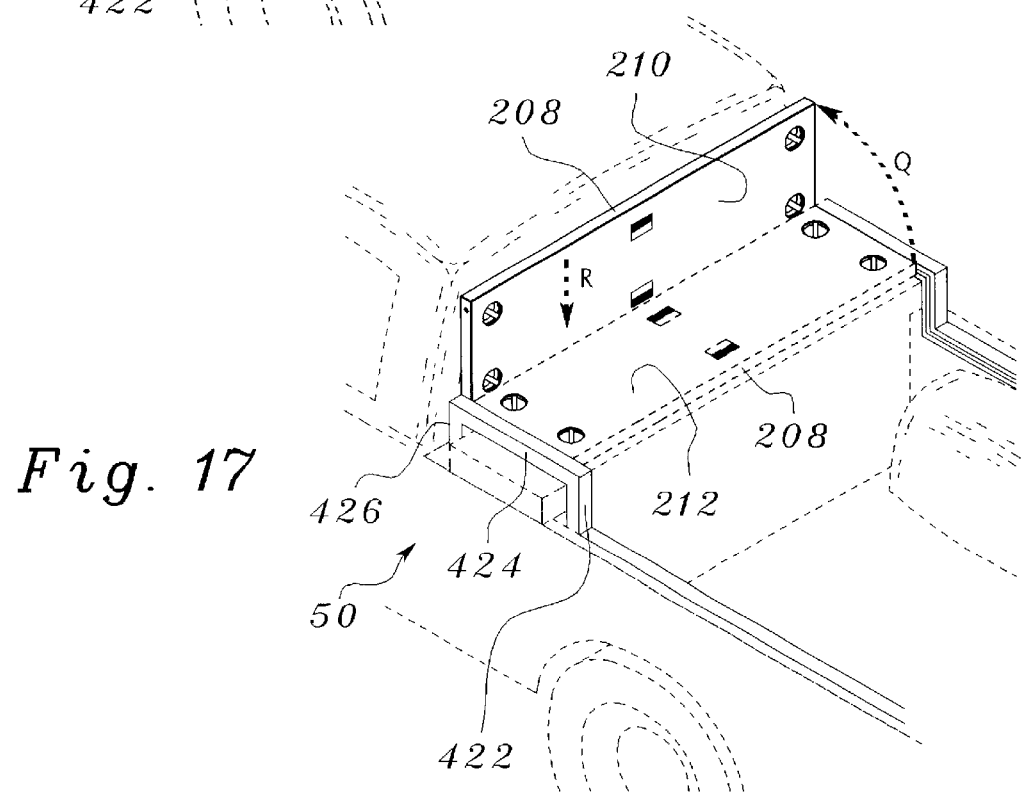
FIG. 17 depicts the tailgate positioned for movement between the cab wall and the storage container.

Referring to FIG. 16, tailgate 200 is rotated in direction O about first pin 290 and fourth pin 296 until rear face 212 of tailgate 200 is lying flat on container 300 and facing upward. Second pin 292 and third pin 294 are extended into the groove of first container horizontal rail 414 and second container horizontal rail 424. Tailgate 200 is pushed forward in direction P until second pin 292 and third pin 294 reach the end of first container horizontal rail 414 and second container horizontal rail 424 respectively. Tailgate 200 is then rotated about second pin 292 and third pin 294 in direction Q until tailgate 200 is perpendicular to bed 54 and parallel to cab wall 52 (See FIG. 17). Tailgate 200 is then pushed downward in direction R with second pin 292 traveling in the groove of first front extended vertical rail 416 and third pin 294 traveling in the groove of second front extended vertical rail 426. When second end 208 of tailgate 200 is lower than first container horizontal rail 414 and second container horizontal rail 424, first pin 290 and fourth pin 296 are extended to engage the grooves in first front extended vertical rail 416 and second front extended vertical rail 426 respectively. With all four pins extended, tailgate 200 is secured and first end 206 will come to rest on first pads 101 (see FIG. 1) and rear face 212 will engage second pads 103 (See FIG. 1).

As a further alternative, first container horizontal rail 414 and second container horizontal rail 424 may be employed with rail system 100 as in FIGS. 9 through 12, and first rear horizontal rail 410 and second rear horizontal rail 420 are used to assist in guiding tailgate 200 over top 320 of container 300.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A slidable tailgate apparatus for a vehicle having a cab wall, a first wall and a second wall comprising:
    a tailgate slidingly engaged in a rail system fixedly engaged to said first wall and said second wall;
    wherein said rail system further comprises a first rear vertical rail, a first horizontal rail, a first front vertical rail, a second rear vertical rail, a second horizontal rail, and a second front vertical rail;
    wherein the first front vertical rail and the second front vertical rail are disposed at the proximate end of the first and second walls relative to the cab wall; and
    wherein the first rear vertical rail and the second rear vertical rail are disposed at the distal end of the first and second walls relative to the cab wall.

2. The slidable tailgate apparatus of claim 1 wherein said tailgate has four pins adapted for extension beyond said tailgate and retraction within said tailgate by a plurality of handles.

3. The slidable tailgate apparatus of claim 1 wherein said rail system further comprises a first horizontal rail and a second horizontal rail.

4. The slidable tailgate apparatus of claim 1 wherein said rail system further comprises a first horizontal rail built into said first wall and a second horizontal rail built into said second wall.

5. The slidable tailgate apparatus of claim 1 wherein said rail system farther comprises:
    a first rear vertical rail, a first horizontal rail, a first front vertical rail, each built into said first wall;
    a second rear vertical rail, a second horizontal rail, a second front vertical rail, each built into said second wall;
    wherein the first front vertical rail and the second front vertical rail are disposed at the proximate end of the first and second walls relative to the cab wall; and
    wherein the first rear vertical rail and the second rear vertical rail are disposed at the distal end of the first and second walls relative to the cab wall.

6. The slidable tailgate apparatus of claim 1 wherein said tailgate has a first handle for extending and retracting a first pin, a second handle for extending and retracting a second pin, a third handle for extending and retracting a third pin, and a fourth handle for extending and retracting a fourth pin.

7. The slidable tailgate apparatus of claim 1 wherein said tailgate is reversible.

8. The slidable tailgate apparatus of claim 1 further comprising a plurality of first pads affixed to said bed.

9. The slidable tailgate apparatus of claim 1 further comprising a plurality of second pads affixed to said cab wall.

10. The slidable tailgate apparatus of claim 1 further comprising a container having a first container horizontal rail and a second container horizontal rail;
    wherein the first container horizontal rail and the second container horizontal rail are affixed to the container.

11. A slidable tailgate apparatus for a vehicle having a cab wall, a first wall and a second wall comprising:
    a first rear vertical rail affixed to said first wall and a second rear vertical rail affixed to said second wall;
    a first rear horizontal rail affixed to said first wall and a second rear horizontal rail affixed to said second wall;
    a container having a first container vertical rail, a second container vertical rail, a first container horizontal rail and a second container horizontal rail;
    a first extended front vertical rail affixed to said first wall and a second extended front vertical rail affixed to said second wall; and
    a tailgate adapted for slidable engagement in said first rear vertical rail, said second rear vertical rail, said first rear horizontal rail, said second rear horizontal rail, said first container vertical rail, said second container vertical rail, said first container horizontal rail, said second container horizontal rail, said first extended front vertical rail and said second extended front vertical rail.

12. The slidable tailgate apparatus of claim 11 wherein said tailgate has four pins adapted for extension beyond said tailgate and retraction within said tailgate by a plurality of handles.

13. A combination truck and tailgate comprising:
    a truck having a cab wall, a first wall and a second wall;
    a rail system built into said first wall and said second wall;
    a tailgate adapted for slidable engagement with said rail system; and
    wherein, said tailgate can be moved from a first position in the rear of said truck to a second position parallel to said cab wall.

14. The slidable tailgate apparatus of claim 13 wherein said tailgate has a first handle for extending and retracting a first pin, a second handle for extending and retracting a second pin, a third handle for extending and retracting a third pin, and a fourth handle for extending and retracting a fourth pin.

15. The slidable tailgate apparatus of claim 13 wherein said tailgate has a first dual handle and a third dual handle connected to a first pin and a fourth pin, and a second dual handle and a fourth dual handle connected to a second pin and a third pin.

16. The slidable tailgate apparatus of claim 13 wherein said rail system further comprises a first horizontal rail and a second horizontal rail.

17. The slidable tailgate apparatus of claim 13 wherein said rail system further comprises a first rear vertical rail, a first horizontal rail, a first front vertical rail, a second rear vertical rail, a second horizontal rail, and a second front vertical rail.

18. The slidable tailgate apparatus of claim 1 wherein said tailgate has a first dual handle and a third dual handle each connected to a first pin and a fourth pin, and a second dual handle and a fourth dual handle each connected to a second pin and a third pin.

* * * * *